United States Patent

Beffa et al.

[11] 4,053,462
[45] Oct. 11, 1977

[54] UNSYMMETRICAL PHENYL AZO NAPHTHYL CHROMIUM COMPLEX DYES

[75] Inventors: Fabio Beffa, Riehen, Switzerland; Gerhard Back, Lorrach, Germany

[73] Assignee: Ciba-Geigy Corporation, Ardsley, N.Y.

[21] Appl. No.: 711,199

[22] Filed: Aug. 4, 1976

Related U.S. Application Data

[62] Division of Ser. No. 479,918, June 17, 1974, Pat. No. 4,005,065.

[30] Foreign Application Priority Data

June 22, 1973 Switzerland .................. 9184/73

[51] Int. Cl.$^2$ .................. C09B 45/16; D06P 1/10; D06P 3/24; D06P 3/32
[52] U.S. Cl. .................. 260/145 B; 260/146 R; 260/145 A; 260/150
[58] Field of Search .................. 260/145 A, 145 B

[56] References Cited

U.S. PATENT DOCUMENTS

| | | | |
|---|---|---|---|
| 2,610,175 | 9/1952 | Widmer et al. | 260/145 A |
| 2,806,760 | 9/1957 | Brassel et al. | 8/42 |
| 2,814,614 | 11/1957 | Zickendraht | 260/145 A |
| 2,820,784 | 1/1958 | Zickendraht et al. | 260/145 A |
| 2,906,746 | 9/1959 | Brassel et al. | 260/145 A |
| 3,005,813 | 10/1961 | Brassel et al. | 260/145 A |
| 3,153,642 | 10/1964 | Ziegler et al. | 260/145 A |
| 3,356,671 | 12/1967 | Johnson et al. | 260/145 A |

FOREIGN PATENT DOCUMENTS

| | | | |
|---|---|---|---|
| 1,155,804 | 5/1958 | France | 260/145 A |

*Primary Examiner*—Floyd D. Higel
*Attorney, Agent, or Firm*—Karl F. Jorda; Edward McC. Roberts; Michael W. Glynn

[57] ABSTRACT

Chromium complex dyes which, in the form of their free acid, have the formula

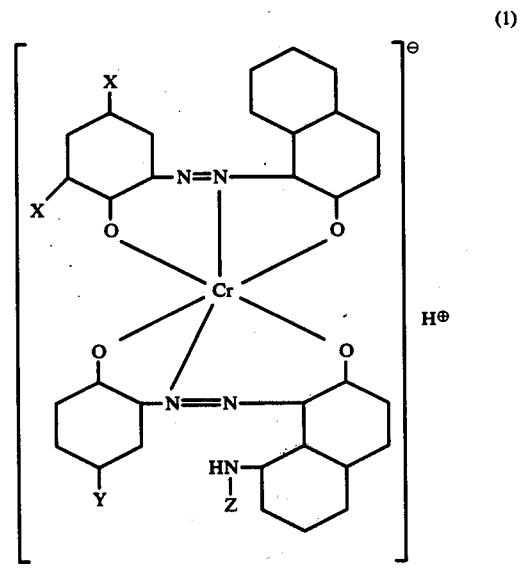

(1)

wherein one X represents the sulphonic acid group and the other X represents the nitro group, Y is a sulfone or sulfonamide group and Z is an acyl group. The dyes are suitable for dyeing natural and synthetic polyamides to produce dyeings which are level and have good fastness to light, perspiration, fulling, decatizing and carbonizing.

1 Claim, No Drawings

UNSYMMETRICAL PHENYL AZO NAPHTHYL CHROMIUM COMPLEX DYES

This is a division of application Ser. No. 479,918, filed on June 17, 1974, now U.S. Pat. No. 4,005,065.

The present invention provides valuable new 1:2 chromium complex dyes which, in the form of their free acid, have the formula (1)

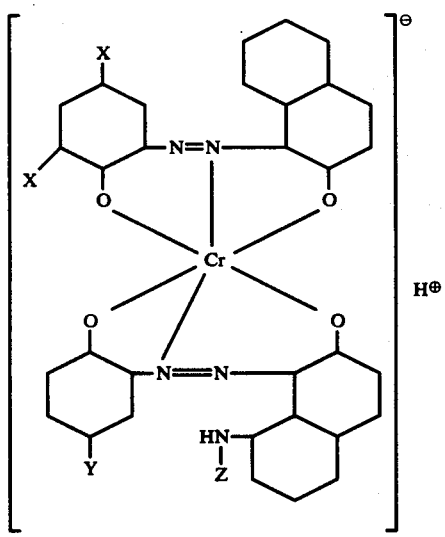

(1)

wherein one X represents the sulphonic acid group and the other X represents the nitro group, Y represents the sulphonic acid group or the -SO$_2$R or

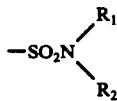

group, and Z represents an acyl group.

If Y represents the -SO$_2$R group, then R can be a lower alkyl radical which is optionally substituted by halogen atoms, especially chlorine, or by aryl groups, above all by the phenyl group, and is for example the methyl, chloromethyl, ethyl or benzyl group, a cycloalkyl or an aryl radical, in particular the phenyl group, or in that case a phenyl group which is substituted by halogen atoms, such as chlorine or bromine, or by nitro, methyl or methoxy.

If Y represents the

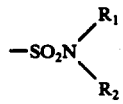

group, R$_1$ is advantageously hydrogen or an optionally substituted lower alkyl radical and R$_2$ is with advantage hydrogen or an optionally substituted lower alkyl, cycloalkyl or aryl radical, or R$_1$ and R$_2$, together with the nitrogen atom to which they are bonded, and optionally with the inclusion of a further heteroatom, form a non-aromatic heteroring with 5 or 6 members.

Where R$_1$ and R$_2$ represent each an optionally substituted alkyl radical, such alkyl radicals are straight chain or branched alkyl groups which can contain substituents, in particular the hydroxy, cyano, lower alkoxy or aryl group, e.g. the phenyl group, or halogen atoms, such as chlorine or bromine, for example the methyl, ethyl, iso-propyl, tert.butyl, β-hydroxyethyl, β- or γ-hydroxypropyl, β-cyanoethyl, β-methoxyethyl, β-ethoxyethyl, benzyl, phenethyl, chloromethyl, β-chloroethyl or β-bromoethyl group.

Where R and R$_2$ represent a cyclohexyl radical, such radicals may be, for example, cycloalkyl groups with preferably 5- or 6-membered rings, in particular the cyclohexyl group.

If R$_2$ represents an aryl radical, such a radical belongs preferably to the benzene series and can contain customary non-ionogenic ring substituents. As examples of such substituents, particularly at the phenyl radical, there may be cited: halogen, such as fluorine, chlorine or bromine, lower alkyl groups, such as methyl, or lower alkoxy groups, such as methoxy.

Where R$_1$ and R$_2$, together with the nitrogen atom to which they are bonded, and optionally with the inclusion of a further heteroatom, form the radical of a non-aromatic heteroring with 5 or 6 members, such a radical is in particular the pyrrolidino, piperidino or morpholino group.

Preferably Y represents a lower alkylsulphonyl group, the -SO$_2$NH$_2$ group, or a lower N-monosubstituted or N,N-disubstituted dialkylsulphonamide group.

An acyl radical represented by Z is derived from aliphatic or aromatic sulphonic acids and, in particular, carboxylic acids, or from carbonic acid monoalkyl esters or monoaryl esters. The term "acyl" therefore comprises lower alkanoyl, alkoxycarbonyl and alkylsulphonyl groups, e.g. the acetyl, chloroacetyl, propionyl, butyryl, methoxycarbonyl, ethoxycarbonyl, methylsulphonyl or ethylsulphonyl group, as well as aroyl, aryloxycarbonyl and arylsulphonyl groups, such as the benzoyl, chlorobenzoyl, methylbenzoyl, methylbenzoyl, nitrobenzoyl, phenoxycarbonyl, phenylsulphonyl or p-methylphenylsulphonyl group. The term "aryl" signifies in this context above all the phenyl group and also phenyl groups which are substituted by halogen, e.g. chlorine or bromine, nitro, lower alkyl or lower alkoxy groups.

The term "lower" used to qualify alkyl, alkoxy, alkanoyl and alkoxycarbonyl groups indicates that these groups contain at most 4 carbon atoms.

The dyes of the formula (1) are obtained by converting one of the two azo dyes of the formulae (2) and (3)

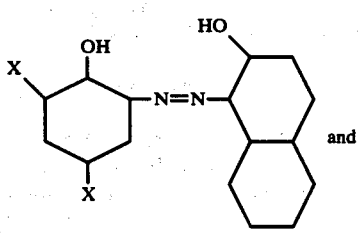

(2)

and (3)

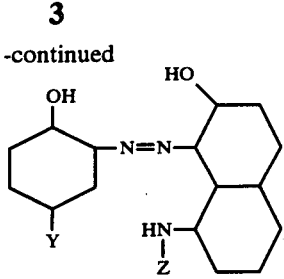

into the 1:1 chromium complex and subsequently reacting this with the other non-chromed azo dye to give the 1:2 chromium complex dye.

A preferred mode of manufacture consists in reacting together the 1:1 chromium complex of a monoazo dye of the formula (2)

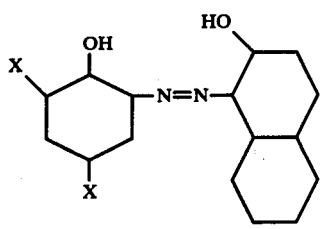

(2)

with a monoazo dye of the formula (3)

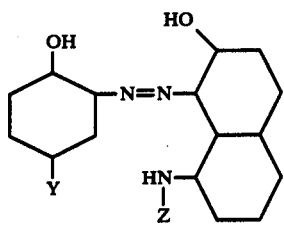

(3)

in the approximate ratio 1:1.

It is possible to manufacture the metallisable monoazo dyes of the formulae (2) and (3) in known manner by coupling o-hydroxydiazo compounds of the benzene series as defined herein with β-naphthol and with 1-acylamino-7-hydroxynaphthalene respectively.

The preferred dyes are those of the formula (3) wherein Z represents a lower alkanoyl, alkoxycarbonyl or an optionally substituted benzoyl group and Y represents a lower alkylsulphonyl radical.

Examples of suitable diazo components of dyes of the formula (3) are:
2-amino-1-hydroxybenzene-4-sulphonamide,
2-amino-1-hydroxybenzene-4-N-methylsulphonamide,
2-amino-1-hydroxybenzene-4-N,N-dimethylsulphonamide,
2-amino-1-hydroxybenzene-4-N-β-hydroxyethylsulphonamide,
2-amino-1-hydroxybenzene-4-N-phenylsulphonamide,
2-amino-1-hydroxybenzene-4-N-β-cyanoethylsulphonamide,
2-amino-1-hydroxybenzene-4-N-cyclohexylsulphonamide,
2-amino-1-hydroxybenzene-4-N-benzylsulphonamide,
2-amino-1-hydroxybenzene-4-methylsulphone,
2-amino-1-hydroxybenzene-4-chloromethylsulphone,
2-amino-1-hydroxybenzene-4-ethylsulphone,
2-amino-1-hydroxybenzene-4-phenylsulphone,
2-amino-hydroxybenzene-4-p-chlorophenylsulphone,
2-amino-1-hydroxybenzene-4-p-methylphenylsulphone,
2-amino-1-hydroxybenzene-4-benzylsulphone.

As coupling components of azo dyes of the formula (3) there may be cited:
1-acetylamino-7-hydroxynaphthalene,
1-chloroacetylamino-7-hydroxynaphthalene,
1-methoxycarbonylamino-7-hydroxynaphthalene,
1-butyrylamino-7-hydroxynaphthalene,
1-benzoylamino-7-hydroxynaphthalene,
1-(p-chlorobenzoylamino)-7-hydroxynaphthalene,
1-(p-methylbenzoylamino)-7-hydroxynaphthalene,
1-methylsulphonylamino-7-hydroxynaphthalene,
1-(p-methylphenylsulphonylamino)-7-hydroxynaphthalene,
1-ethoxycarbonylamino-7-hydroxynaphthalene, and
1-ethylsulphonylamino-7-hydroxynaphthalene.

The conversion of the monoazo dye of the formula (2) or (3) into the 1:1 chromium complex is accomplished by conventional methods which are known per se, e.g. by reacting it in acid medium with a surplus of a salt of trivalent chromium, such as chromium formiate, chromium sulphate or chromium fluoride, at boiling temperature or optionally at temperatures exceeding 100° C. In general, it is advisable to carry out the metallising e.g. in the presence of organic solvents, such as alcohols or ketones.

As a general rule it proves advantageous not to dry the starting dyes required in the present process after their manufacture and precipitation, but to process them further as a moist paste.

The reaction of the 1:1 chromium complex of the formula (2) or (3) with the metal-free dyes of the formula (3) or (2) is carried out expediently in aqueous, neutral to weakly alkaline medium, in open or sealed apparatus, at normal or elevated temperature, e.g. at temperatures between 50° C and 120° C. The addition of solvents, e.g. alcohols, formamide, can promote the reaction if so desired. It is advisable as a rule to react as far as possible equivalent amounts of the chromium-containing 1:1 complex and the metal-free dye, the molecular ratio between metal-free dye and 1:1 complex being with advantage at least 0.85:1 and at most 1:0.85. A surplus of metal-containing dye is usually less disadvantageous than one of metal-free dye. The closer this ratio is to 1:1 the more advantageous the result generally is.

The new chromium-containing mixed complexes obtained by the above processes are isolated with advantage in the form of their salts, in particular alkali salts, above all sodium salts, or also ammonium salts or salts of organic amines with positively charged nitrogen atom, and are suitable for dyeing and printing the most varied materials, but chiefly for dyeing materials made from natural polyamides, such as silk, wool, and, in particular, leather, and also for dyeing and printing synthetic polyamide fibres, e.g. fibres made from polyamides or polyurethanes. They are readily soluble in water, above all in the form of their alkali salts, and are suitable for dyeing from a neutral or weakly acid, e.g. acetic acid, bath. It can be advisable to add to the dyebath a levelling agent as conventionally employed in the dyeing of leather and textiles. The resulting grey dyeings are level and have good fastness to light, washing, perspiration, fulling, decatising and carbonising.

The dyes colour various sorts of leather, usually without assistants, and with complete exhaustion of the dyebath. Special emphasis is to be placed on the fact the dyeings obteined or leather with the dyes according to the invention have in particular excellent fastness to water, diffusion (e.g. marking-off on PVC) and dry cleaning.

The following Examples illustrate the invention, the parts and percentages being by weight unless otherwise stated.

EXAMPLE 1

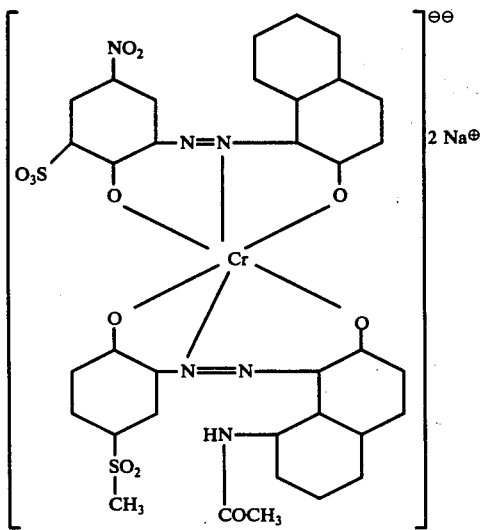

The following ingredients are suspended in 1000 parts of water: 39.9 parts of the monoazo dye obtained from 2-amino-1-hydroxybenzene-4-methylsulphone and 1-acetylamino-7-hydroxynaphthalene, 43.9 parts of the complex 1:1 chromium compound corresponding to 5.2 parts of chromium and 38.9 parts of the monoazo dye from diazotised 4-nitro-2-amino-1-hydroxybenzene-6-sulphonic acid and 2-hydroxynaphthalene, and 18 parts of sodium carbonate.

The mixture is heated to 80°-85° C and kept at this temperature until the starting materials have disappeared. The new chromium-containing dye is precipitated by addition of sodium chloride, filtered off, and dried, to yeild a dark powder which dyes wool or polyamide material from a weakly acid bath in grey shades. The dyeings have good fastness properties.

EXAMPLE 2

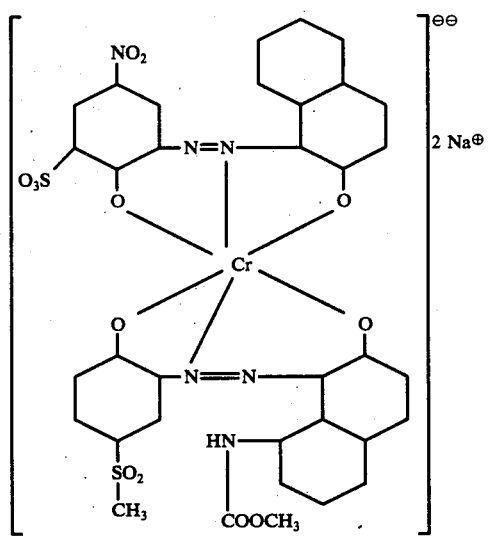

18 parts of sodium carbonate and 41.5 parts of the monoazo dye from diazotised 2-amino-1-hydroxy benzene-4-methylsulphone and 1-carbomethoxyamino-7-hydroxynaphthalene are added to 1000 parts of water. The complex 1:1 chromium compound corresponding to 5.2 parts of chromium and 38.9 parts of the monoazo dye from diazotised 4-nitro-2-amino-1-hydroxynaphthalene-6-sulphonic acid and 2-hydroxynaphthalene is then added.

The mixture is heated to 80°-85° C and kept at this temperature until the starting materials have disappeared. The new chromium-containing dye is precipitated by addition of sodium chloride and isolated by the usual method. The product is dried to yield a dark powder which dyes wool, polyamide material and leather in very fast grey shades.

EXAMPLE 3

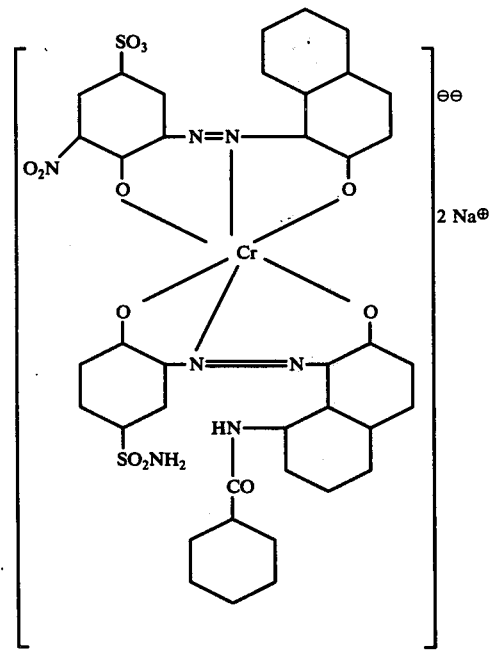

100 parts by volume of 2 normal sodium hydroxide solution and 46.2 parts of the monoazo dye from diazotised 2-amino-1-hydroxybenzene-4-sulphonamide and 1-benzoyl-amino-7-hydroxynaphthalene are added to 1000 parts of water. The complex 1:1 chromium compound corresponding to 5.2 parts of chromium and 38.9 parts of the monoazo dye from diazotised 6-nitro-2-amino-1-hydroxybenzene-4-sulphonic acid and 2-hydroxynaphthalene is then added.

The mixture is heated to 75°–80 C and kept at this temperature until the starting materials have disappeared. The new chromium-containing adduct is precipitated by addition of sodium chloride. It is filtered off and dried, to yield a dark powder which dyes wool, polyamide material and leather from a weakly acid bath in fast, grey shades.

EXAMPLE 4

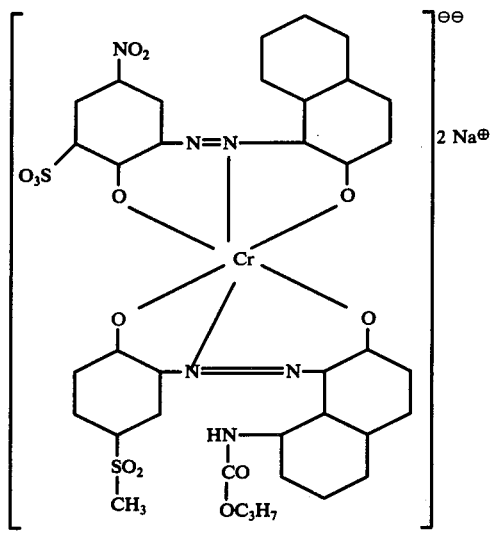

43.9 parts of the 1:1 chromium complex of the dye from diazotised 4-nitro-2-amino-1-hydroxybenzene-6-sulphonic acid and 2-hydroxynaphthalene and 44.3 parts of the dye from diazotised 2-amino-1-hydroxybenzene-4-methylsulphone and 1-carbopropoxy-amino-7-hydroxynaphthalene are stirred in 1500 parts of hot water and the resulting mixture is neutralised. Upon addition of 412 parts of sodium hydroxide and 6.2 parts of sodium acetate the batch is stirred for 2 hours at 85° C to 90° C.

When the reaction is terminated, the dye is precipitated with sodium chloride, filtered off, and dried to yield a dark powder which forms a grey solution in water and dyes wool, polyamide material and leather from a weakly acid bath in fast, grey shades with good fastness properties.

By substituting for the dyes used in Examples 1 to 4 equimolar amounts of the 1:1 chromium complexes listed in column II and of the monoazo dyes listed in column III of the following Table, and by otherwise carrying out the procedure as described in Examples 1 to 4, there are obtained further corresponding 1:2 chromium complex dyes which produce on wool, polyamide, and in particular, leather, dyeings with similarly good fastness properties in the shades indicated in the last column of the Table.

Table

| No. | (1:1) chromium complex | chromium-free monoazo dye | Shade |
|---|---|---|---|
| 1 | HO₃S-[OH, NO₂]-N=N-[OH-naphthyl] | [OH, SO₂C₂H₅]-N=N-[OH, NH-CO-CH₃ naphthyl] | grey |
| 2 | " | [OH, SO₂C₂H₅]-N=N-[OH, NH-COOCH₃ naphthyl] | " |
| 3 | " | [OH, SO₂NHOH₃]-N=N-[OH, NH-COOCH₃ naphthyl] | " |

Table-continued
| No. | (1:1) chromium complex | chromium-free monoazo dye | Shade |
|---|---|---|---|
| 4 | " | 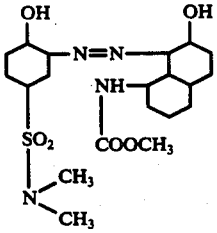 | " |
| 5 | " | 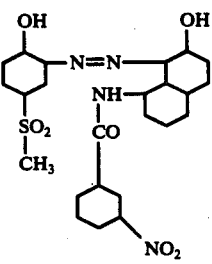 | " |
| 6 | " | 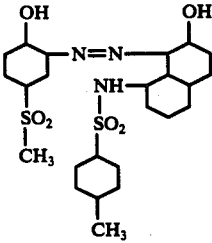 | " |
| 7 | " | 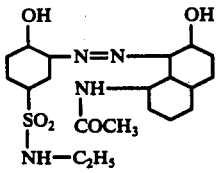 | " |
| 8 | " | 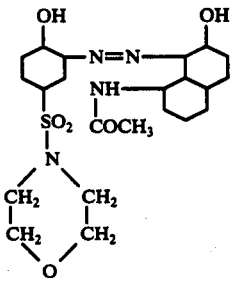 | " |
| 9 | " | 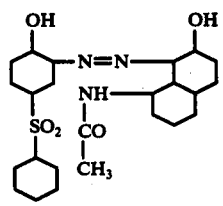 | " |
| 10 | " | 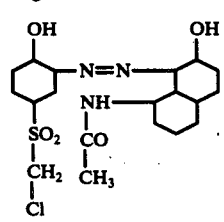 | " |

Table-continued
| No. | (1:1) chromium complex | chromium-free monoazo dye | Shade |
|---|---|---|---|
| 11 | " | 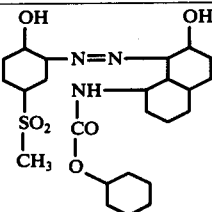 | " |
| 12 | " | 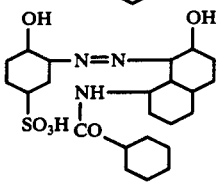 | " |
| 13 | " | 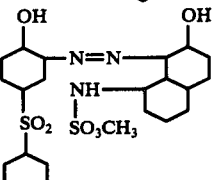 | " |
| 14 | " | 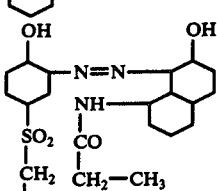 | " |
| 15 | 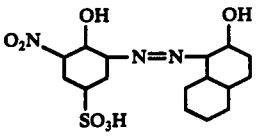 | 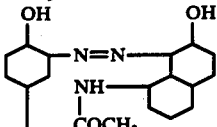 | " |
| 16 | " | 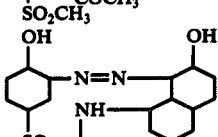 | " |
| 17 | " | 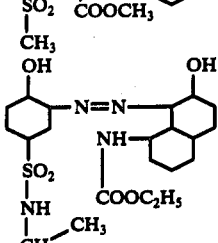 | " |
| 18 | " | 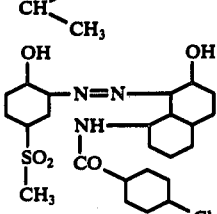 | " |
| 19 | " | 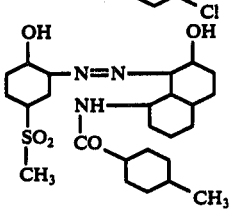 | " |

Table-continued

| No. | (1:1) chromium complex | chromium-free monoazo dye | Shade |
|---|---|---|---|
| 20 | " | 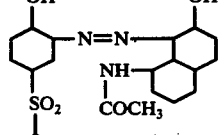 | " |
| 21 | " | 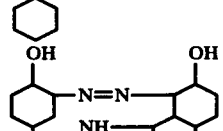 | " |
| 22 | 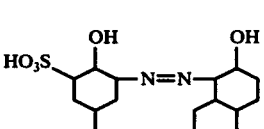 | 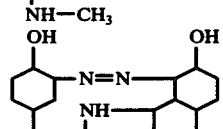 | " |
| 23 | " | 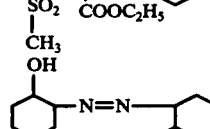 | " |

DYEING PROCEDURE FOR WOOL 4 parts of the chromium-containing dye according to Example 1 are dissolved in 4000 parts of water and 100 parts of thoroughly wetted wool is put into this dyebath at 40°–50° C. Then 2 parts of 40% acetic acid are added and the bath is heated to the boil over the course of ½ hour and kept for ¾ hour at boiling temperature. The wool is then rinsed with cold water and dried. The grey wool dyeing is characterised by good wet fastness properties and excellent light fastness.

DYEING PROCEDURE FOR LEATHER 100 parts of garment suede leather (dry weight) are wetted back at 50° C over the course of 2 hours in a solution of 1000 parts of water and 2 parts of 24% ammonia and subsequently dyed at 60° C for 1 hour in a solution of 1000 parts of water, 2 parts of 24% ammonia and 6 parts of dye according to Example 1. Then a solution of 40 parts of water and 4 parts of 85% formic acid are added and dyeing is continued for a further 30 minutes. The leather is then rinsed with cold water and dried. The grey dyeing is characterised by good wet and light fastness.

We claim:

1. A chromium complex dye, which, in the form of its free acid, has the formula

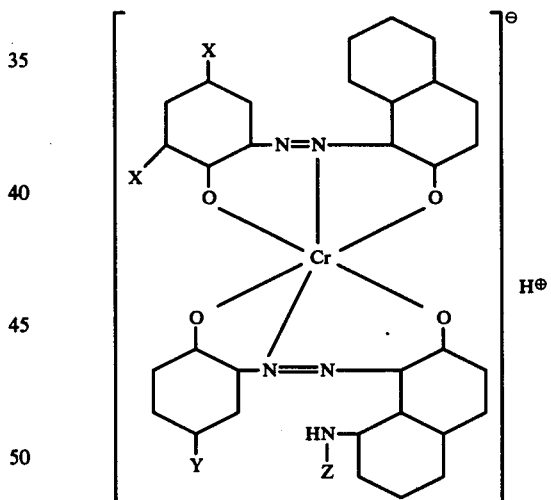

wherein one X is sulfo and the other X is nitro, Y is

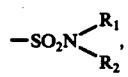

where $R_1$ and $R_2$ together with the nitrogen to which they are attached represent pyrrolidino, piperidino or morpholino; and Z is lower alkanoyl, lower alkoxycarbonyl, lower alkylsulfonyl, or is arylcarbonyl, aryloxycarbonyl or arylsulfonyl wherein "aryl" is phenyl or phenyl substituted by chloro, bromo, nitro, lower alkyl or lower alkoxy.

* * * * *